(12) United States Patent
Farooq et al.

(10) Patent No.: US 11,975,678 B2
(45) Date of Patent: May 7, 2024

(54) AIRBAG ASSEMBLY FOR RECLINED VEHICLE OCCUPANT

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 17/746,248

(22) Filed: May 17, 2022

(65) Prior Publication Data

US 2023/0373431 A1   Nov. 23, 2023

(51) Int. Cl.
| | |
|---|---|
| *B60R 21/16* | (2006.01) |
| *B60N 2/42* | (2006.01) |
| *B60R 22/14* | (2006.01) |
| *B60R 21/00* | (2006.01) |

(52) U.S. Cl.
CPC ............ *B60R 22/14* (2013.01); *B60N 2/4214* (2013.01); *B60R 21/16* (2013.01); *B60R 2021/0034* (2013.01)

(58) Field of Classification Search
CPC .............. B60R 2021/161; B60R 21/16; B60R 21/23184; B60R 2021/0034; B60N 2/888; B60N 2/4214

See application file for complete search history.

(56) References Cited

U.S. PATENT DOCUMENTS

| | | | |
|---|---|---|---|
| 6,367,839 B1 | 4/2002 | Langholf | |
| 6,612,606 B1 | 9/2003 | Bergenheim et al. | |
| 7,264,275 B2 | 9/2007 | Wang et al. | |
| 10,875,486 B2* | 12/2020 | Kim | B60R 21/231 |
| 11,110,883 B1* | 9/2021 | Deng | B60R 21/264 |
| 11,390,235 B2* | 7/2022 | Kim | B60R 21/2338 |
| 2006/0125223 A1 | 6/2006 | Wang et al. | |
| 2006/0249944 A1 | 11/2006 | Jessup et al. | |
| 2009/0200818 A1 | 8/2009 | Giesa et al. | |

(Continued)

FOREIGN PATENT DOCUMENTS

| | | |
|---|---|---|
| DE | 102014213301 A1 | 1/2016 |
| DE | 102018206090 A1 | 10/2019 |

(Continued)

*Primary Examiner* — Timothy J Brindley
(74) *Attorney, Agent, or Firm* — Frank A. MacKenzie; Bejin Bieneman PLC (57) ABSTRACT

An assembly includes a bed having a reclined position in which the bed is elongated along an axis A. The bed includes a first side and a second side with the axis A between the first side and the second side. The bed in the reclined position has a first end and a second end spaced from each other along the axis A. The bed includes an occupant support surface between the first end and second end. The assembly includes an airbag that is inflatable from an uninflated position to an inflated position. The airbag is housed in the first end in the uninflated position. The airbag in the inflated position has an arch shape between the first side of the bed and the second side of the bed. The arch is elongated along the axis A from the first end toward the second end above the occupant support surface.

20 Claims, 10 Drawing Sheets

(56) References Cited

U.S. PATENT DOCUMENTS

2019/0299903 A1* 10/2019 Nagasawa ........... B60R 21/0132
2019/0389414 A1* 12/2019 Masuda ................ B60R 21/207
2020/0101921 A1*  4/2020 Nagasawa ............ B60R 21/231
2022/0009443 A1*  1/2022 Fischer ................ B60R 21/013

FOREIGN PATENT DOCUMENTS

| DE | 102018206093 A1 | | 10/2019 | | |
|---|---|---|---|---|---|
| DE | 102018206094 A1 | | 10/2019 | | |
| DE | 102019201302 A1 | * | 8/2020 | | |
| DE | 102020204852 A1 | * | 11/2020 | | |
| DE | 102020101509 A1 | | 7/2021 | | |
| EP | 4140829 A1 | * | 3/2023 | ........... | B60R 21/207 |
| WO | WO-2020254218 A1 | * | 12/2020 | ........... | B60R 21/207 |

\* cited by examiner

AIRBAG ASSEMBLY FOR RECLINED VEHICLE OCCUPANT

BACKGROUND

A vehicle body defines a passenger compartment to house occupants of the vehicle. The vehicle typically includes a plurality of beds in the passenger cabin. The beds may be arranged in the passenger compartment in any suitable position, i.e., as front beds, rear beds, second-row beds, third-row beds, etc. While all modern OEMs of passenger vehicles currently warn occupants against not sitting upright in a moving vehicle due to safety concerns, it is anticipated that technology and the regulatory framework may evolve in the future to where such an activity is safe and permissible.

BRIEF DESCRIPTION OF THE DRAWINGS

FIG. 1 is a perspective view of a vehicle including two reclined vehicle beds. While all modern OEMs of passenger vehicles currently warn occupants against not sitting upright in a moving vehicle due to safety concerns, it is anticipated that technology and the regulatory framework may evolve in the future to where such an activity is safe and permissible and FIG. 1 shows one such example.

DETAILED DESCRIPTION

An assembly includes a vehicle bed having a reclined position in which the vehicle bed is elongated along an axis. The vehicle bed includes a first side and a second side with the axis between the first side and the second side. The vehicle bed in the reclined position has a first end and a second end spaced from each other along the axis. The vehicle bed has an occupant support surface between the first end and second end. An airbag is inflatable from an uninflated position to an inflated position. The airbag is housed in the first end in the uninflated position. The airbag in the inflated position has an arch shape between the first side of the vehicle bed and the second side of the vehicle bed. The arch shape is elongated along the axis from the first end toward the second end above the occupant support surface.

The assembly may include a pyrotechnic device operatively coupled to the airbag to pull the airbag from the first end toward the second end. The pyrotechnic device may be connected to the bed. The assembly may include a tether between the pyrotechnic device and the airbag.

The assembly may include a pyrotechnic device connected to the bed and a tether connected to the pyrotechnic device and the airbag. The pyrotechnic device may be connected to the second end of the bed.

The assembly may include a track elongated along the axis. A tether is connected to the airbag and is slideably engaged with the track. A pyrotechnic device is connected to the tether. The assembly may include a cable connecting the pyrotechnic device to the tether.

At least one belt restraint may be extendable from the first side of the bed to the second side of the bed. The belt restraint may be between the occupant support surface and the airbag in the inflated position. The belt restraint may bias the airbag away from the occupant support surface in the inflated position.

The arch shape of the airbag may extend from the first end to the second end in the inflated position.

The airbag may include an inflation chamber that is arch shaped from the first end of the bed to the second end of the bed.

The airbag may have an arched tubular segment extending from the first side of the bed to the second side of the bed in the arch shape at the first end of the bed.

The airbag may include a plurality of linear tubular segments each elongated along the axis, the linear tubular segments being positioned in the arch shape.

The airbag may include a plurality of uninflatable panels, the uninflatable panels and linear tubular segments being in an alternating arrangement in the arch shape. The assembly may include an uninflatable panel connecting at least two of the linear tubular segments. The airbag may have an arched tubular segment supporting the linear tubular segments, the arched tubular segment extending from the first side of the bed to the second side of the bed in the arch shape. The airbag may have a second arched tubular segment supported by the linear tubular segments. The second arched tubular segment may extend from the first side of the bed to the second side of the bed in the arch shape. The arched tubular segment may be at the first end of the bed and the second arched tubular segment being at the second end of the bed.

The airbag may include a panel at the first end of the bed in a plane transverse to the axis of the bed.

With reference to the figures, wherein like numerals indicate like parts throughout the several views, an assembly 10 for a vehicle 12 includes a vehicle bed 14 (hereinafter referred to as "bed 14"). The bed 14 having a reclined position in which the bed 14 is elongated along an axis A. The bed 14 includes a first side 16 and a second side 18 with the axis A between the first side 16 and the second side 18. The bed 14 in the reclined position has a first end 20 and a second end 22 spaced from each other along the axis A. The bed 14 includes an occupant support surface 24 between the first end 20 and second end 22. The assembly 10 includes an airbag 26 that is inflatable from an uninflated position to an inflated position. The airbag 26 is housed in the first end 20 in the uninflated position. The airbag 26 in the inflated position has an arch shape between the first side 16 of the bed 14 and the second side 18 of the bed 14. The arch is elongated along the axis A from the first end 20 toward the second end 22 above the occupant support surface 24.

In the event of an impact to the vehicle 12, the airbag 26 inflates from an uninflated position to an inflated position to control the kinematics of an occupant on the bed 14. Specifically, in the inflated position, the occupant is on the bed 14 between the occupant support surface 24 and the airbag 26. In the uninflated position, the airbag 26 is housed in the first end 20 of the bed 14 and inflates to elongate over the occupant toward the second end 22 of the bed 14. The airbag 26 is supported by the first end 20 of the bed 14 and inflates to have the arch shape to surround the occupant on the first side 16 of the bed 14 and the second side 18 of the bed 14. For example, the airbag 26 may control the kinematics of the occupant between the occupant support surface 24 and the airbag 26.

The vehicle 12 may be any suitable type of ground vehicle 12, e.g., a passenger or commercial automobile such as a sedan, a coupe, a truck, a sport utility, a crossover, a van, a minivan, a taxi, a bus, etc.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle 12 includes at least one bed assembly 28. The bed assembly 28 includes at least one bed 14 and at least one airbag assembly 30. The bed 14 may include a base 32 supported on a floor 34 of the vehicle 12. In example including more than one bed 14, the bed assembly 28 may include a divider 36 between the beds 14. In the example shown in the figures, the vehicle 12 includes one bed assembly 28 that includes two beds 14 on the base 32.

The base 32 may be fixed to the floor 34, e.g., fastened to the floor 34. The base 32 may be unitary with the rest of the bed 14 or components of the bed 14 may be separate from the base 32 and supported on the base 32. The base 32 may be upholstered to match the rest of the bed 14.

In examples including the divider 36 between the beds 14, the divider 36 may extend upwardly relative to the beds 14 to horizontally separate the beds 14 from each other. The divider 36 may be unitary with the bed 14, e.g., the base 32, or may be separate from the bed 14 and supported on the bed 14. In such examples, the divider 36 may be unitary with the beds 14 or separate from and adjacent to the beds 14. The divider 36 may be upholstered to match the beds 14 or may include a rigid surface, e.g., to support personal belongings of the occupant including food, drink, personal electronic devices, etc. The divider 36 may include a class-A surfaces, i.e., a finished surface exposed to view by a customer and free of unaesthetic blemishes and defects.

As set forth above, the bed assembly 28 includes at least one bed 14. In the example shown in the figures, the vehicle 12 includes two beds 14 namely a first bed 14 and a second bed 14. In other examples, the vehicle 12 may include any number of beds 14, i.e., one or more. In examples including more than one bed 14, the beds 14 may be similar or identical to each other. In the example shown in the figures, the first bed 14 and the second bed 14 have common features and the common features are identified with common numerals for the first bed 14 and the second bed 14.

As set forth above, the beds 14 are supported by the floor 34 of the vehicle 12. The beds 14 may be arranged in any suitable arrangement in the passenger compartment. As in the example shown in the figures, one or more of the beds 14 may be at the front end of the passenger compartment. In other examples, one or more of the beds 14 may be behind the front end of the passenger compartment, e.g., at the rear end of the passenger compartment. The beds 14 may be movable relative to the floor 34 of the vehicle 12 to various positions, e.g., movable fore-and-aft and/or cross-vehicle 12. The beds 14 may be of any suitable type, e.g., a bucket seat, a bench seat, etc.

The bed 14 is shown reclined relative to the floor 34 in the example shown in the figures. While all modern OEMs of passenger vehicles 12 currently warn occupants against not sitting upright in a moving vehicle due to safety concerns, it is anticipated that technology and the regulatory framework may evolve in the future to where such an activity is safe and permissible and the figures show one such example.

In the reclined position, an occupant may lie comfortably stretched out on the bed 14. As set forth above, the bed 14 in the reclined position is elongated along the axis A. In examples including more than one bed 14, the axes A of the beds 14 may be parallel in the reclined positions, e.g., as shown with the first bed 14 and the second bed 14 in the example in the figures. In the examples shown in the figures, the first bed 14 is elongated along the axis A and the second bed 14 is elongated along a second axis A.

The bed 14 includes the occupant support surface 24. The occupant may be disposed on the occupant support surface 24. The occupant support surface 24 is generally horizontal when the bed 14 is reclined. The occupant support surface 24 in the reclined position may include a ramped portion, as shown in the example in the figures, to support the shoulders and/or head of the occupant in the reclined position.

In some examples, the bed 14 may be stationary in the reclined position. In some examples, the bed 14 may be a convertible seat that can convert between being a vehicle 12 seat and the vehicle bed 14. In such examples, the bed 14 may include a seatback and a seat bottom, and in such examples, the seatback may be supported by the seat bottom and may be movable relative to the seat bottom. Specifically, the seatback may be pivotable relative to the seat bottom to the reclined position. In examples in which the seatback is pivotable, the seat back may be pivotable relative to the seat bottom to a plurality of angular positions including the reclined position. For example, the seatback may be pivotable relative to the seat bottom to an upright position, the reclined position, and positions therebetween. The seatback may be pivotable relative to the seat bottom and releasably fixed relative to the seat bottom in any suitable way and with any suitable reclining mechanism, including known reclining mechanisms. In the reclined position, the seatback may be parallel to the seat bottom and/or parallel to the floor 34 of the vehicle 12. For example, the seatback and the seat bottom may, in combination, form the occupant support surface 24.

The bed 14 includes a bed 14 frame (not numbered) and a covering (not numbered) supported on the bed 14 frame. The bed 14 frame may include tubes, beams, etc. The bed 14 frame may be of any suitable plastic material, e.g., carbon fiber reinforced plastic (CFRP), glass fiber-reinforced semi-finished thermoplastic composite (organosheet), etc. As another example, some or all components of the bed 14 frame may be formed of a suitable metal, e.g., steel, aluminum, etc.

The bed 14 includes the covering supported by the bed 14 frame. The covering may be cloth, leather, faux leather, or any other suitable material. The covering may have a class-A surface, i.e., a finished surface exposed to view by a customer and free of unaesthetic blemishes and defects. The bed 14 may include padding material between the covering and the bed 14 frame. The padding material may be foam or any other suitable material. The covering may be stitched in panels around the bed 14 frame and padding material. As described further below, the bed 14, e.g., the covering, may include one or more tear seams through which the airbag assembly 30 is deployable.

The bed 14 includes two sides 16, 18. Specifically, the bed 14 includes the first side 16 and the second side 18. The first side 16 and the second side 18 are opposite to each other about the axis A of the bed 14, i.e., the axis A is between the first side 16 and the second side 18. The bed 14 terminates at the first side 16 and the second side 18. In examples including the divider 36, one of the sides 16, 18 of the bed 14 may be at the divider 36. For example, in the example shown in the figures, the second side 18 of the first bed 14 is at the divider 36 and first side 16 of the second bed 14 is at the divider 36. The first side 16 and the second side 18 may support an occupant laterally relative to the bed 14, e.g., the first side 16 and the second side 18 may include bolsters. The occupant support surface 24 is between the first side 16 and the second side 18.

The bed 14 includes the first end 20 and the second end 22. The second end 22 is spaced from the first end 20 along the axis A. The first end 20 and the second end 22 each extend from the first side 16 to the second side 18. The bed 14 may terminate at the first end 20 and the second end 22. When an occupant is on the bed 14, one of the first end 20 and the second end 22 is adjacent the head of the occupant and the other of the first end 20 and the second end 22 is adjacent the feet of the occupant. The occupant support surface 24 is between the first end 20 and the second end 22.

As set forth above, the bed assembly 28 includes at least one airbag assembly 30. The airbag assembly 30 is inflatable to surround the occupant support surface 24s of the first bed 14 and the second bed 14, as described further below. The airbag assembly 30 includes at least one inflator 80 that inflates the airbags 26 with inflation medium, as described further below.

As set forth above, the bed assembly 28 may include more than one bed 14, as shown in the figures, and in such examples, the bed assembly 28 may include one airbag assembly 30 for each bed 14, i.e., a first airbag assembly 30 for the first bed 14 and a second airbag assembly 30 for the second bed 14. Common numerals are used to identify common features of the first bed 14, second bed 14, first airbag assembly 30 and second airbag assembly 30.

As set forth above, the airbag assembly 30 includes the airbag 26. Two examples of the airbag 26 are shown in the figures. Specifically, in one example shown in FIGS. 2-4, the airbag 26 has an inflation chamber 38 that is arch shaped from the first end 20 of the bed 14 to the second end 22 of the bed 14. As another example shown in the FIGS. 5-7, the airbag 26 includes a plurality of linear tubular segments 40 each elongated along the axis A. The linear tubular segments 40 are positioned in the arch shape and the airbag 26 includes a plurality of uninflatable panels 42 with the uninflatable panels 42 and linear tubular segments 40 being in an alternating arrangement in the arch shape. Common numerals are used to identify common features of the example airbag 26 in FIGS. 2-4 and the example airbag 26 shown in FIGS. 5-7.

The airbag 26 is supported by the bed 14 and may be supported by the divider 36 in the uninflated position and the inflated position. The airbag 26 may be housed in the first end 20 of the bed 14 in the uninflated position. In the example shown in the figures, the first airbag 26 is under the covering of the first bed 14, e.g. mounted to the frame of the first bed 14 below the covering of the first bed 14, and the second airbag 26 is under the covering of the second bed 14, e.g., mounted to the frame of the second bed 14 below the covering of the second bed 14. The airbags 26 may be rolled or otherwise packaged in the bed 14 and/or divider 36 in the uninflated position and may break through tear seams in the beds 14 and/or divider 36 to the inflated position. The airbags 26 may be anchored to the bed 14 and/or divider 36, e.g., with fasteners.

In the inflated positions, the airbag 26 is elongated along the axis A of the bed 14. In other words, the longest dimension of the airbag 26 is along the axis A of the bed 14. The longest dimension of the airbag 26 may be designed to extend along the entire occupant support surface 24, i.e., along an entire occupant in the reclined position. As an example, the first airbag 26 may extend from the first end 20 of the first bed 14 to the second end 22 of the first bed 14 and the second airbag 26 may extend from the first end 20 of the second bed 14 to the second end 22 of the second bed 14. As described further below, an airbag deployment mechanism 44 may pull the airbag 26 from the first end 20 of the bed 14 toward the second end 22 of the bed 14 when the airbag 26 is in the inflated position.

The airbag 26 in the inflated position has the arch shape between the first side 16 of the bed 14 and the second side 18 of the bed 14. The arch shape is above the occupant supports surface. Specifically, the arch shape curves over the occupant support surface 24 from the first side 16 to the second side 18. The arch shape has a curved cross-sectional shape, such as a partial circle, partial oval, or any other suitable shape that curves from the first side 16 of the bed 14 to the second side 18 of the bed 14. The arch shape of the airbag 26 surrounds the occupant on the occupant support surface 24 to control the kinematics of the occupant on the occupant support surface 24. The arch shape is continuous, i.e., uninterrupted, to surround the occupant on the occupant support surface 24.

The arch shape of the airbag 26 is elongated along the axis A from the first end 20 toward the second end 22. The arch shape may be generally curve about the axis A. In the examples shown in the figures, the arch shape of the airbag 26 extends from the first end 20 to the second end 22 of the bed 14. In examples in which the arch shape of the airbag 26 extends from the first end 20 to the second end 22 of the bed 14, the arch shape of the airbag 26 controls the kinematics of the occupant between the first end 20 and the second end 22 of the bed 14. The arch shape may have a continuous curved cross-sectional shape from the first end 20 to the second end 22 of the bed 14, such as shown in the examples in the figures. In other words, the curved cross-sectional shape may be substantially the same between the first end 20 and the second end 22.

The airbag 26 may have a main section 46 and one or more arched tubular segments. In the example shown in the figures, the airbag 26 includes the main section 46, one arched tubular segment at the first end 20 of the bed 14, and another arched tubular segment at the second end 22 of the bed 14. In such an example, the main section 46 extends from one arched tubular segment to the other arched tubular segment. The arched tubular segment extends from the first side 16 of the bed 14 to the second side 18 of the bed 14 in the arch shape, i.e., the arched tubular segment follows the arch shape of the airbag 26. The arched tubular segment may have a cross-section that is cylindrical or partial cylindrical. The arched tubular segment may be in fluid communication with the main section 46, i.e., inflated by a common inflator 80 and/or share inflation medium. The arched tubular segment may provide dimensional support to the main section 46 to support the arch shape of the airbag 26 in the inflated position.

The airbag 26 include a panel 48 at the first end 20 of the bed 14 and/or a panel 48 at the second end 22 of the bed 14. In the example shown in the figures, the airbag 26 includes one panel 48 at the first end 20 of the bed 14 and another panel 48 at the second end 22 of the bed 14. The panel 48 is in a plane transverse to the axis A of the bed 14, e.g., in a plane perpendicular to the axis A. The panel 48 controls the kinematics of the occupant.

The inflation of the airbag 26 pulls the panel 48 to deploy the panel 48. For example, the panel 48 may be connected to the arched tubular segment (e.g., by stitching, welding, one-piece weaving, etc.) and arched tubular segment may support the panel 48 in the inflated position. In other words, the weight of the panel 48 is born by the arched tubular segment in the inflated position. The panel 48 is uninflatable. In other words, the panel 48 is separated from any inflation chamber 38 of the airbag 26. The panel 48 does not include a chamber inflatable by inflation medium.

Figure 2:
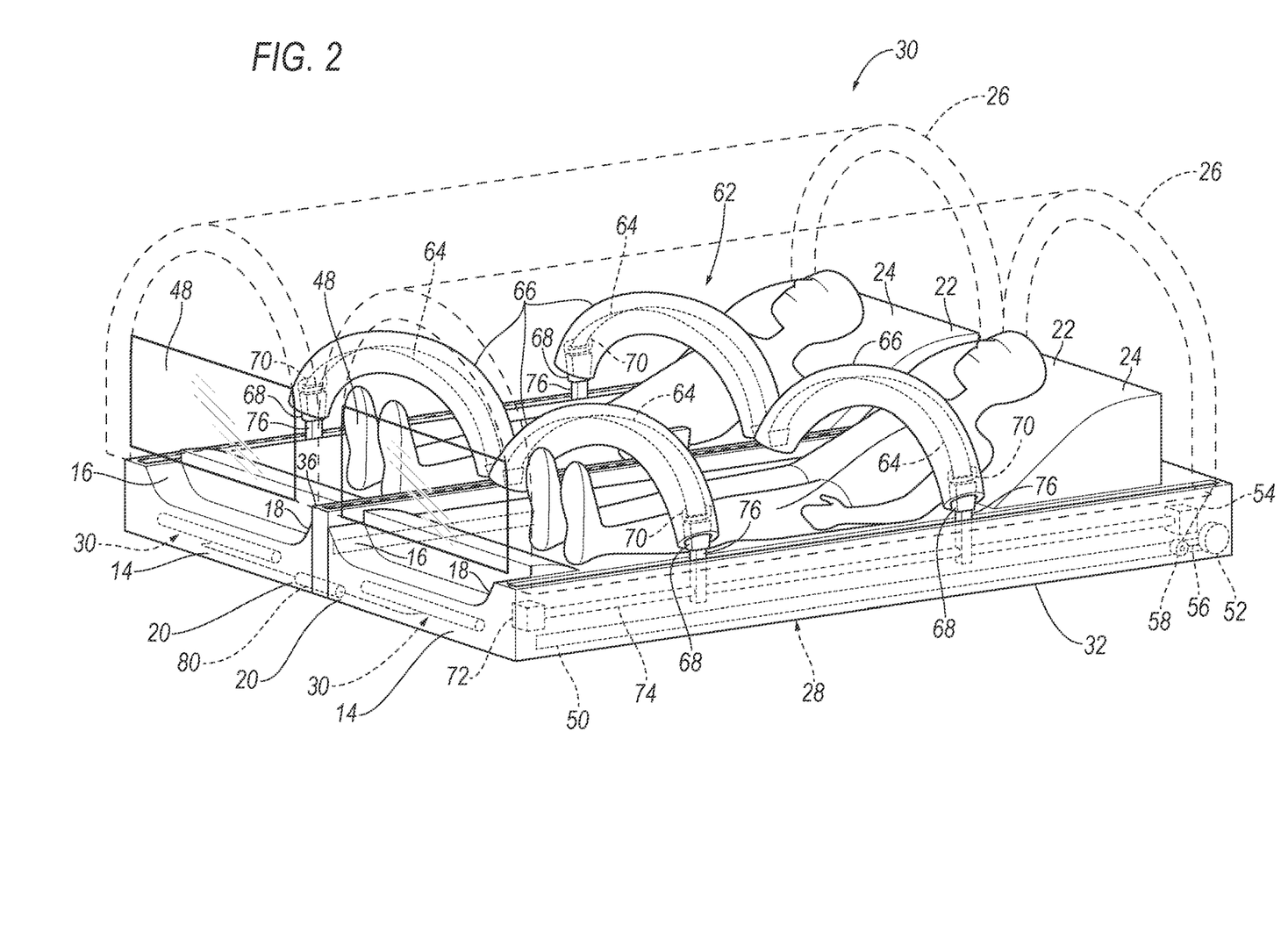
FIG. 2 is a perspective view of the vehicle beds with one example of airbag assemblies in an inflated position.
Figure 3:
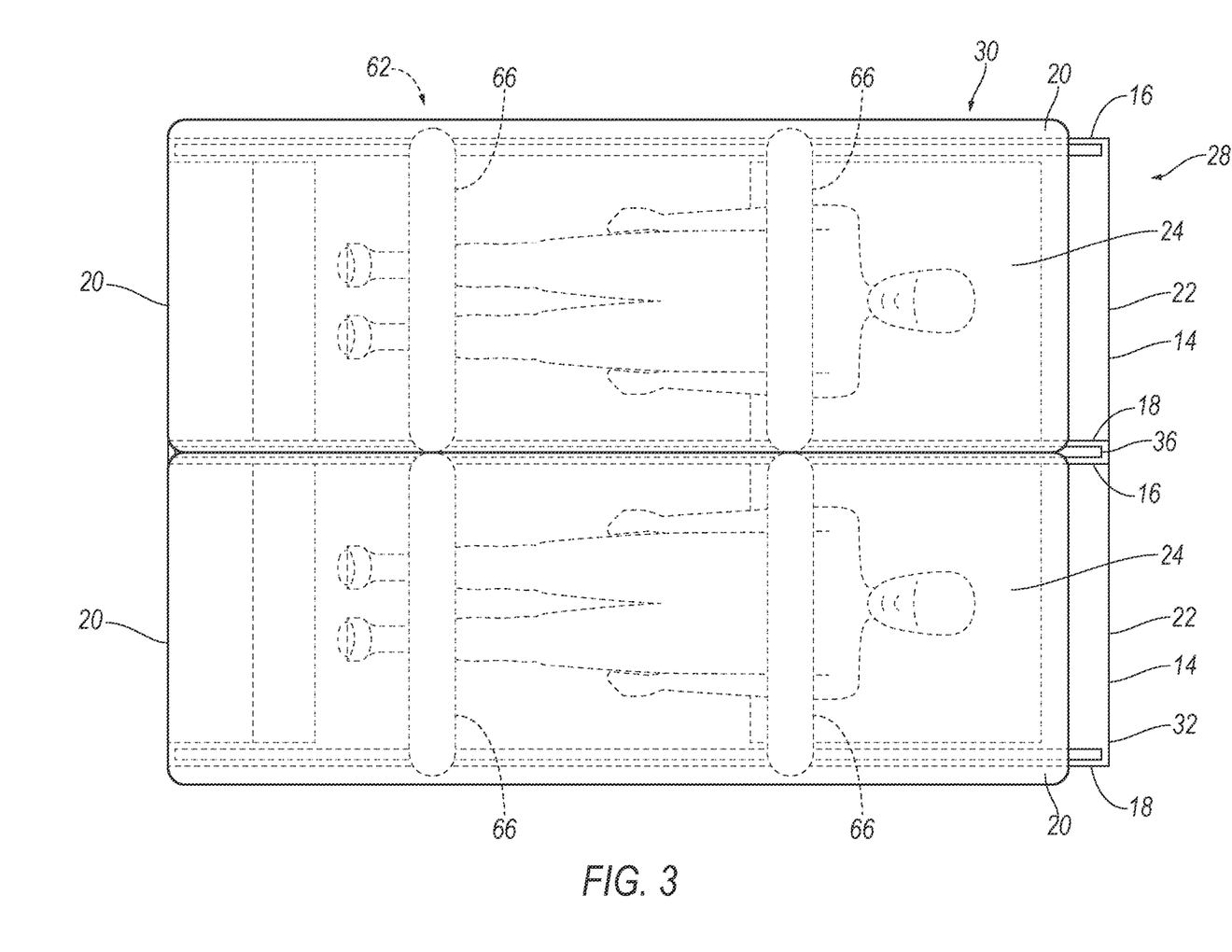
FIG. 3 is a top view of the vehicle beds with the airbag assemblies of FIG. 2 in the inflated position.
Figure 4:
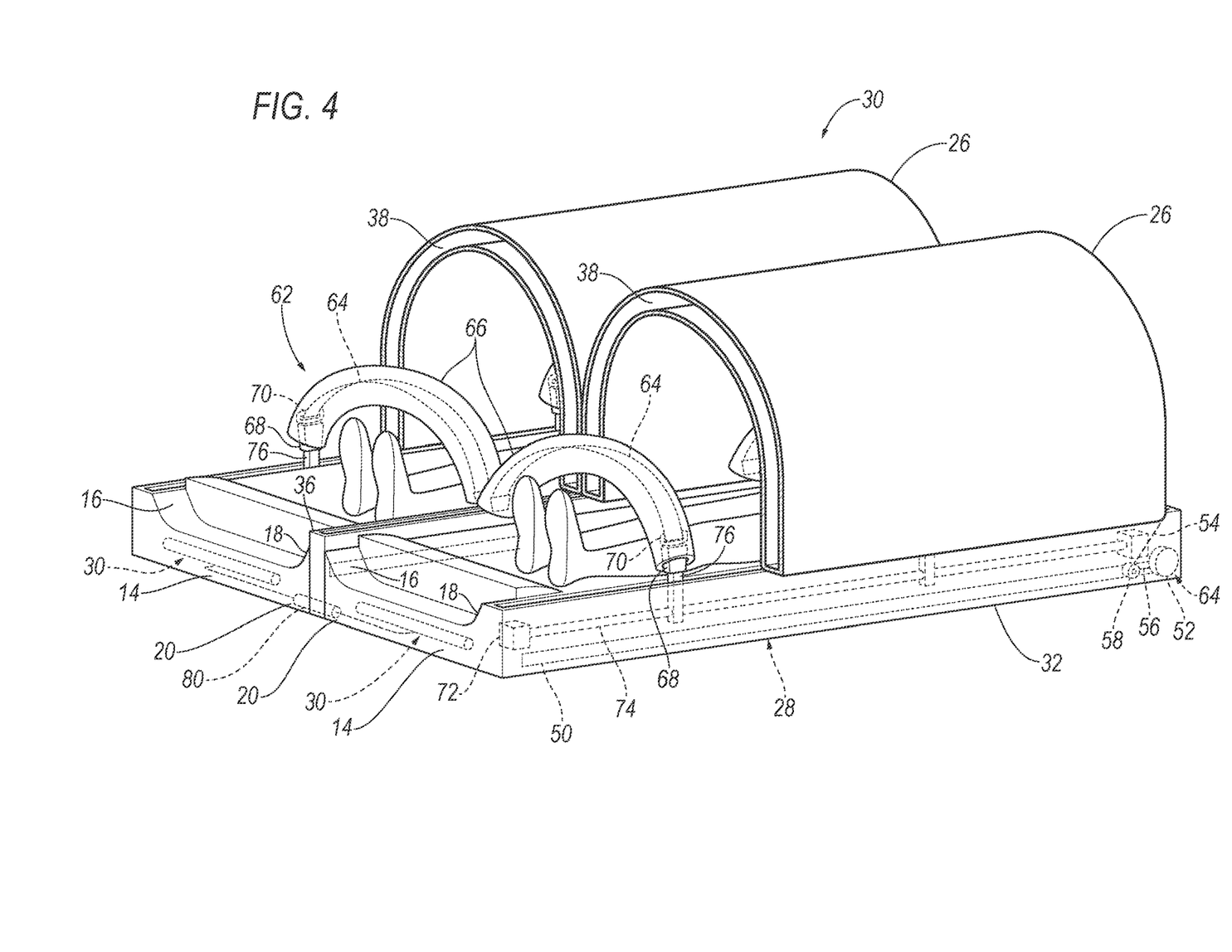
FIG. 4 is a perspective view of the vehicle beds with the airbag assemblies of FIG. 2 in the inflated position with the airbag assemblies shown in cross-section.

As set forth above, in the example shown in FIGS. 2-4, the inflation chamber 38 of the airbag 26 may be arch shaped from the first end 20 of the bed 14 to the second end 22 of the bed 14. Inflation medium from the inflator 80 flows through the inflation chamber 38. The main section 46 of the airbag 26 defines an inflation chamber 90. Specifically, the main section 46 includes a first side 82 at the first side 16 of the bed 14, a second side 84 at the second side 18 of the bed 14, a first end 86 at the first end 20 of the bed 14, and a second end 88 spaced along the axis A from the first end 86 of the main section 46. The inflation medium flows between the first side 82, second side 84, first end 86, and second end 88 of the main section 46 to inflate the main section 46. The main section 46 may have internal baffles, tethers 54, etc. that guide the flow of inflation medium and/or control the shape of the main section 46. As set forth above, the inflation chamber 90 of the main section 46 may be in communication with or separate from an inflation chamber of the arched tubular segments.

Figure 5:
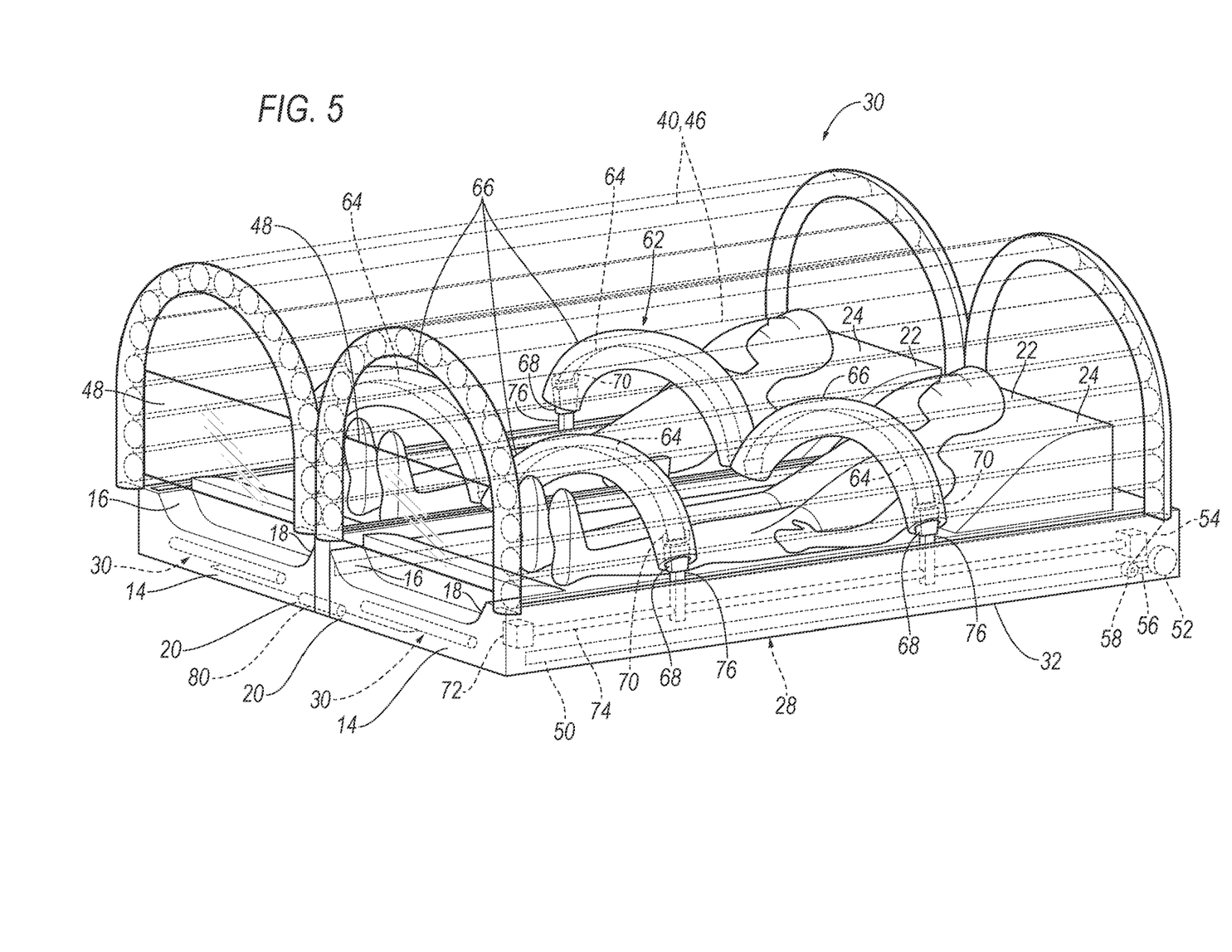
FIG. 5 is a perspective view of the vehicle beds with another example of the airbag assemblies in the inflated position with the airbag assemblies shown in cross-section FIG. 6 top view of the vehicle beds with the airbag assemblies of FIG. 5 in the inflated position.
Figure 6:
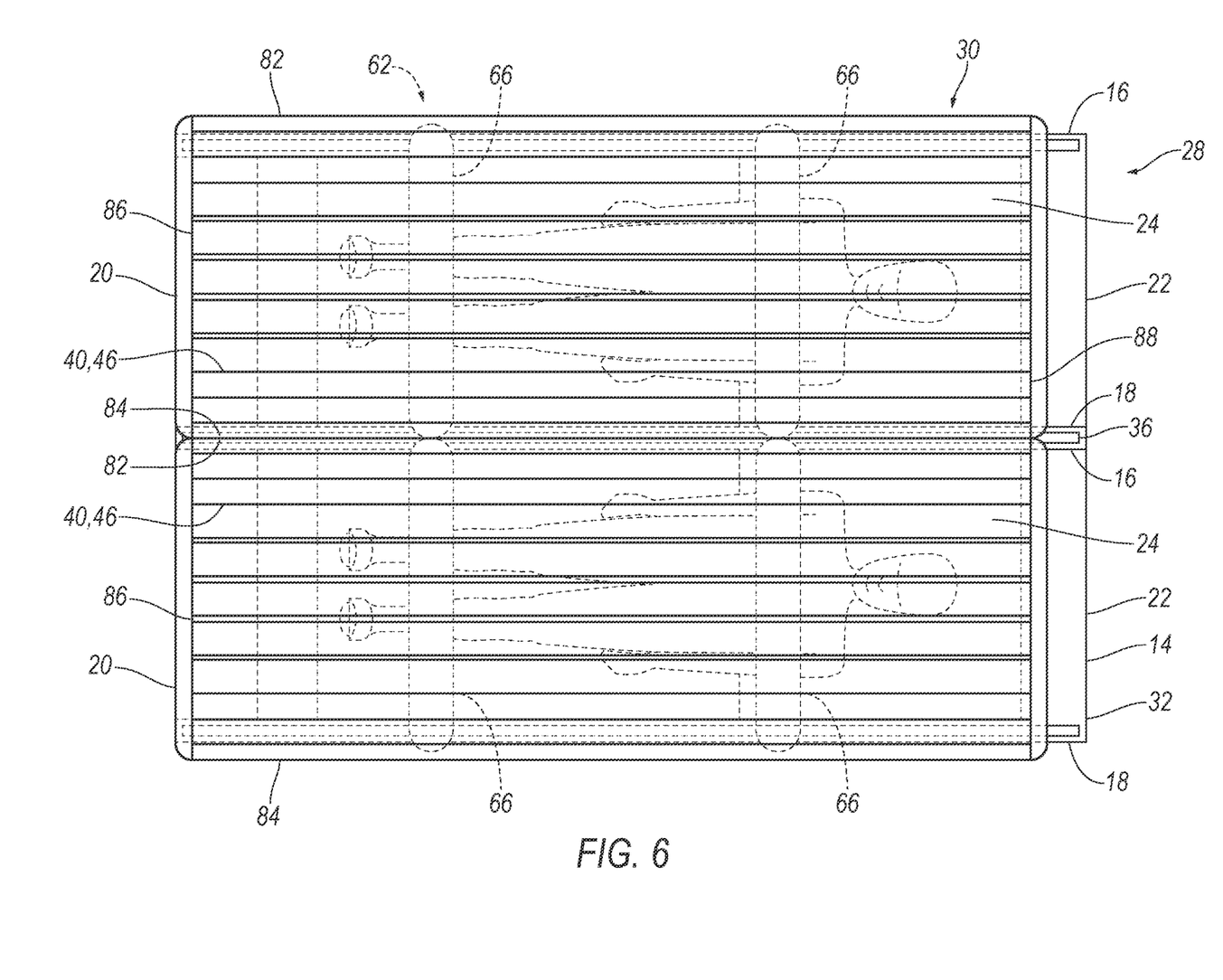
Figure 7:
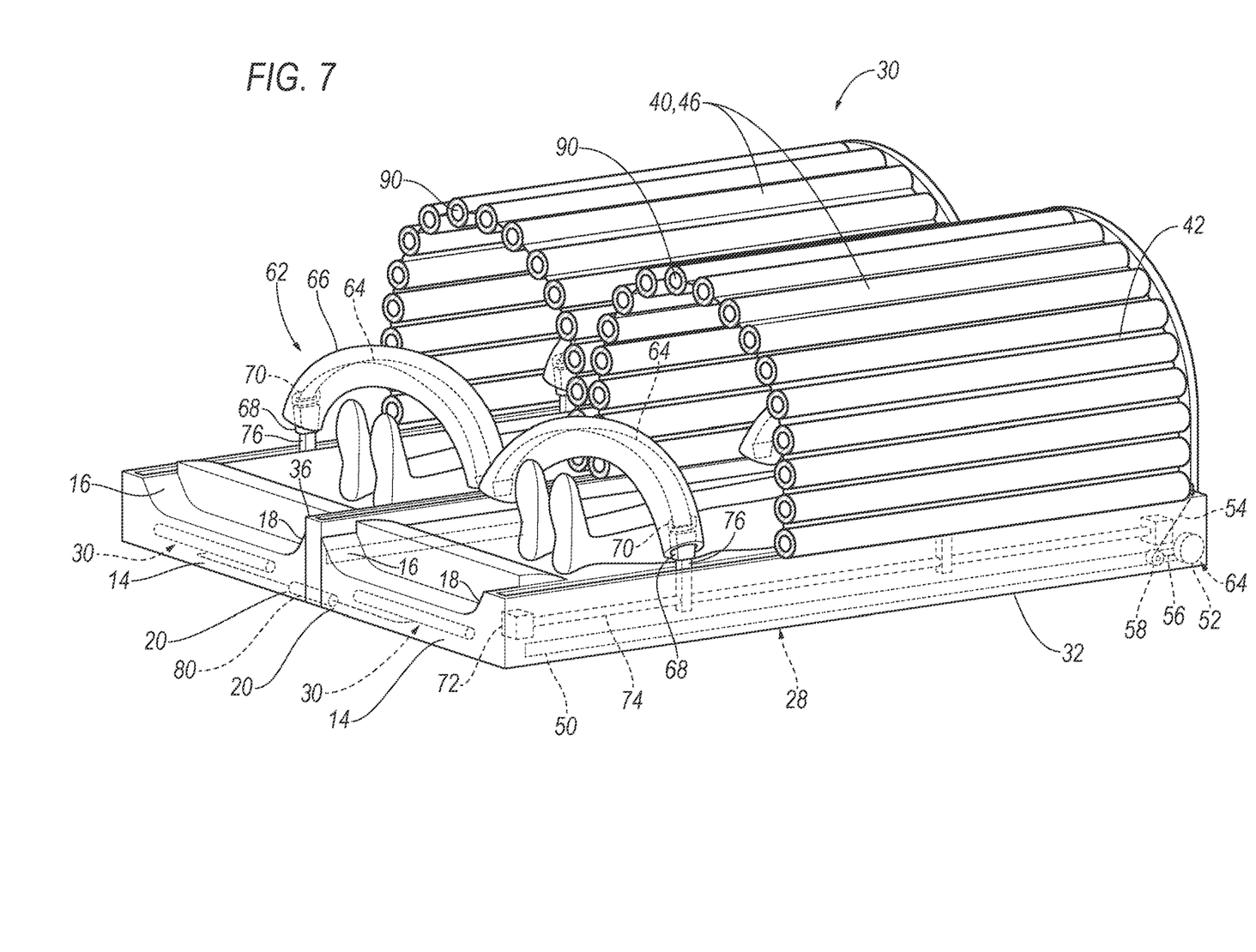
FIG. 7 is a perspective view of the vehicle beds with the airbag assemblies of FIG. 5 in the inflated position with the airbag assemblies shown in cross-section

As set forth above, in the example shown in FIGS. 5-7, the airbag 26 includes the linear tubular segments 40 and the uninflatable panels 42. Specifically, the main section 46 of the airbag 26 includes the linear tubular segments 40 and the uninflatable panels 42. The linear tubular segments 40 and the and the uninflatable panels 42 are arranged in an alternating arrangement in the arch shape. In other words, the main section 46 includes one uninflatable panel 42, then one linear tubular segment 40, then one uninflatable panel 42, then one linear tubular segment 40, and so on, along the arch shape.

As set forth above, the arch shape is elongated along the axis A and may curve about the axis A. Specifically, the linear tubular segments 40 and the uninflatable panels 42 are elongated along the axis A. The linear tubular segments 40 are linear in that the linear tubular segments 40 generally extend linearly along the axis A.

Each of the linear tubular segments 40 defines an inflation chamber 90. The uninflatable panels 42 separate the linear tubular segments 40, and more specifically, separate the inflation chambers 90 of the linear tubular segments 40 along the axis A. The inflation chambers 90 of the linear tubular segments 40, respectively, may be fed by the same inflator 80 or different inflators 80. The inflation chambers 90 of the linear tubular segments 40 may be, for example, fed with inflation medium from one or both arched tubular segments. In such an example, the linear tubular segments 40 are in fluid communication with the arched tubular segments. The uninflatable panels 42 are uninflatable. In other words, the uninflatable panel 42 is separated from any inflation chamber 38 of the airbag 26. The uninflatable panel 42 does not include a chamber inflatable by inflation medium.

The arched tubular segment supports the linear tubular segments 40 and the uninflatable panels 42 in the inflated position. In other words, the weight of the tubular segments and the uninflatable panels 42 is born by the arched tubular segment in the inflated position. In such an example, the inflation of the airbag 26 pushes the linear tubular segments 40 and the uninflatable panels 42 to deploy the linear tubular segments 40 and the uninflatable panels 42. In such examples, the linear tubular segments 40 and the uninflatable panels 42 may be connected to the arched tubular segment, e.g., by stitching, welding, one-piece weaving, etc.

The airbag 26, including the main section 46, the arched tubular segments, the panels 48 may be fabric, e.g., a woven polymer. For example, the fabric may be woven nylon yarn, for example, nylon. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

As set forth above, the airbag assembly 30 includes at least one inflator 80 to inflate the airbag 26. The inflator 80 is in fluid communication with the airbag 26. The inflator 80 expands the airbag 26 with inflation medium, such as a gas, to move the airbag 26 from the uninflated position to the inflated position. The inflator 80 may be supported by any suitable component. For example, the inflator 80 may be supported by the bed 14. The inflator 80 may be, for example, a pyrotechnic inflator 80 that ignites a chemical reaction to generate the inflation medium, a stored gas inflator 80 that releases (e.g., by a pyrotechnic valve) stored gas as the inflation medium, or a hybrid. In the example shown in the figures, one inflator 80 is in fluid communication, e.g., with fill tubes, with the airbag 26 on the first bed 14 and the airbag 26 on the second bed 14. In other examples, any suitable number of inflators 80 may be in fluid communication with any suitable number of airbags 26 and/or components of any one airbag 26.

The bed assembly 28 may include the airbag deployment mechanism 44 that positions the airbag 26 relative to the bed 14, as described further below. In the example shown in the figures, the airbag assembly 30 is inflatable to surround the occupant support surface 24s of the first bed 14 and the second bed 14 in response to a vehicle impact. Specifically, in the examples shown in the figures, the airbag assembly 30 is inflatable and the airbag deployment mechanism 44 is deployable to position the inflated airbag assembly 30 across the occupant support surface 24. In examples including the airbag deployment mechanism 44, the airbag assembly 30 is connected to the airbag deployment mechanism 44, for example, with tethers 54, as described further below.

The airbag deployment mechanism 44 includes a track 50 elongated along the axis A and a pyrotechnic device 52 coupled to the airbag 26 to move the airbag 26 along the track 50. Specifically, the airbag 26 may include a tether 54 connected slideably engaged with the track 50 and a cable 56 connecting the pyrotechnic device 52 to the tether 54. The pyrotechnic device 52 is activated to retract the cable 56, which pulls the tether 54 along the track 50 to move the airbag 26 along the axis A in the inflated position.

The airbag deployment mechanism 44 moves the airbag 26 relative to the bed 14. In the example shown in the figures, the bed assembly 28 includes two airbag deployment mechanisms 44. Specifically, as an example, one airbag deployment mechanism 44 is on one of the first side 16 or second side 18 of the first bed 14 and one airbag deployment mechanism 44 is on the first side 16 or second side 18 of the second bed 14. In such an example, the airbag 26 may be slideably engaged with the bed 14 and may be pulled by the airbag deployment mechanism 44, e.g., the airbag 26 may be passively slideably engaged with the divider 36 between the beds 14 and the airbag 26 in the inflated position.

The airbag assembly 30 includes one or more tethers 54 between the airbag 26 and the airbag deployment mechanism 44. The tether 54, for example, may extend from the airbag 26 to the airbag deployment mechanism 44. In such an example, the tether 54 connects to the pyrotechnic device 52 and the airbag 26.

The airbag deployment mechanism 44 may include the cable 56, at least one track 50, and a roller 58 slideably engaged with the track 50. Specifically, the roller 58 may be fixed to the cable 56 and moves linearly relative to the bed 14 as the cable 56 is retracted by the pyrotechnic device 52. The pyrotechnic device 52 is engaged with the cable 56. The pyrotechnic device 52 retracts the cable 56 to pull the roller 58 relative to the bed 14. The airbag deployment mechanism 44 may be in communication with an occupancy sensor identifying occupancy of the bed 14. Specifically, a computer 60 of a vehicle 12, e.g., a restrains control module, may control the motor based on the occupancy sensor.

The pyrotechnic device 52 includes a pyrotechnic charge. The pyrotechnic charge is activated to activate the pyrotechnic device 52. The pyrotechnic device 52 may be, for example, a rotary actuator or a linear actuator. The pyrotechnic charge is combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

The pyrotechnic device 52 may be a rotary actuator, in which the pyrotechnic charge rotates a shaft connected to the cable 56 such that the cable 56 wraps around the shaft. As other examples the pyrotechnic device 52 may be a linear actuator and may include a piston linkage, in which the pyrotechnic charge for example, drives a piston attached to the tether 54; a ball-in-tube linkage, in which an pyrotechnic charge propels a ball or balls over a cogwheel connected to the tether 54; a mechanical linkage, in which a compressed spring attached to the tether 54 is released; or any other suitable type.

As set forth above the airbag deployment mechanism 44 includes the cable 56. The cable 56 connects the pyrotechnic device 52 to the tether 54. Specifically, the cable 56 may directly or indirectly connect the pyrotechnic device 52 to the tether 54. In the example shown in the figures, the roller 58 is used as an intermediate connection between the cable 56 to the tether 54. The cable 56 may be, for example, metal (such as braided metal strands), fiber, woven fabric, or any suitable material.

The assembly 10 includes at least one airbag deployment mechanism 44. In the example shown in the figures, the airbag deployment mechanism 44 includes two rollers 58 on the first bed 14, and two rollers 58 on the second bed 14. The rollers 58 are moveable along the axis A of the bed 14 i.e., along the occupant support surface 24. For example, the airbag deployment mechanism 44 may include tracks 50 that may slideably receive the rollers 58 and the rollers 58 may be moveable relative to the occupant support surface 24 in the tracks 50. In this example the one or more tracks 50 may be elongated along the first side 16 of the bed 14 and/or the second side 18 of the bed 14. Specifically, the one or more tracks 50 are connected to the first side 16 of the bed 14 and/or the second side 18 of the bed 14.

As set forth above the airbag deployment mechanism 44 includes the track 50. The tether 54 may be slideably engaged with the track 50. Specifically, the tether 54 may be moveably along the track 50 pulled by the pyrotechnic device 52 pulls the tether 54 along the track 50 toward the second end 22 of the bed 14 in the event of a collision. The tether 54 may be directly or indirectly connected to the pyrotechnic device 52.

As set forth above, the pyrotechnic device 52 is operatively coupled to the airbag 26 to pull the airbag 26 from the first end 20 toward the second end 22. In the example shown in the figures, the pyrotechnic device 52 is connected to the bed 14 and pulls the airbag 26 toward the second end 22 of the bed 14 to the inflated position. Specifically, the pyrotechnic device 52 is connected to the second end 22 of the bed 14. The airbag assembly 30 is designed to be moveable along the axis A of the bed 14 without interference from appendages of the occupant. In the example shown in the figures, the airbag 26 first inflates upwards, then is elongated along the axis A as the airbag 26 inflates to deploy the arch shape over the occupant.

Figure 8:
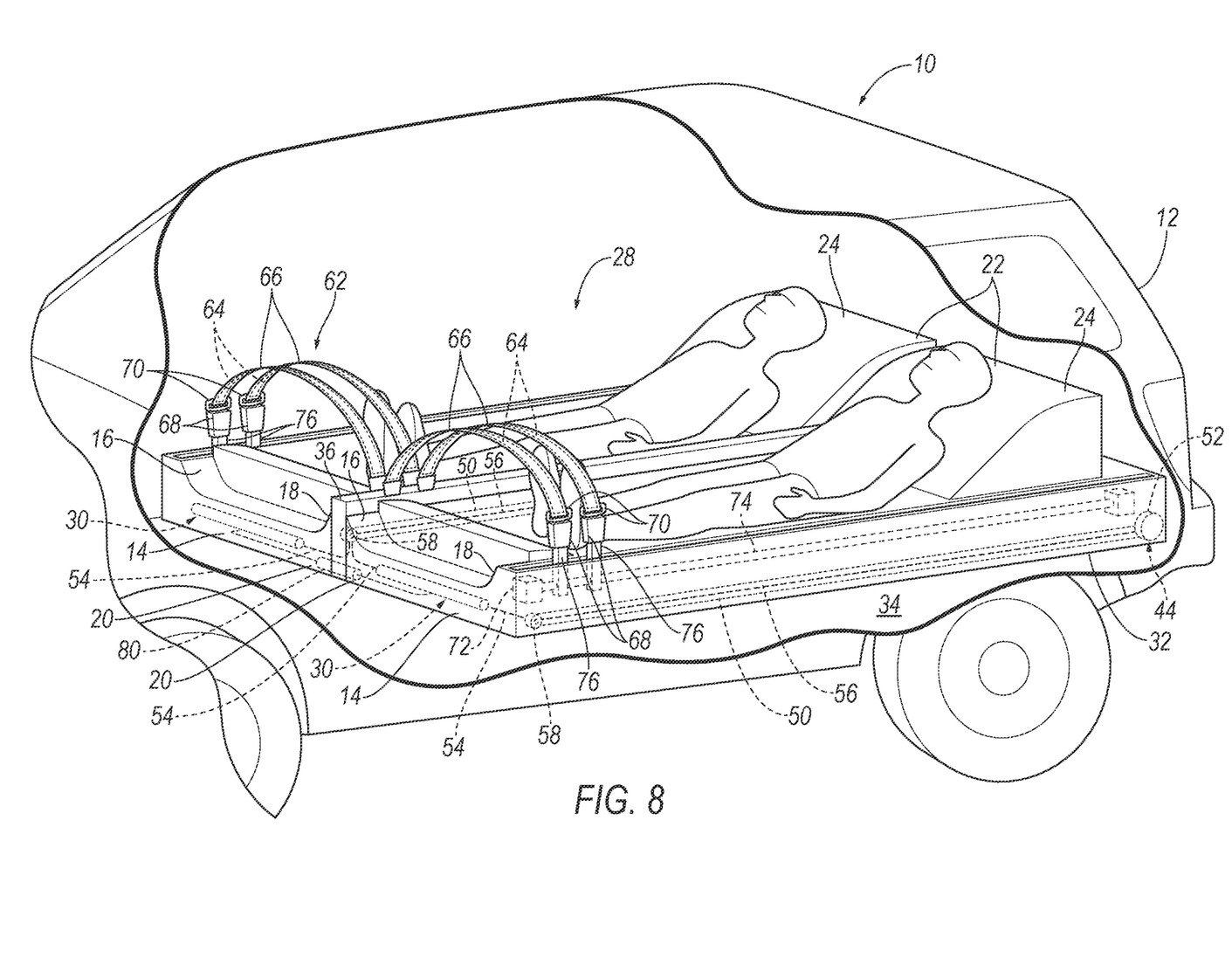
FIG. 8 is a perspective view of the vehicle with components of a belt restraint assembly shown in broken lines and with the belt restraint assembly in a stowed position.
Figure 9:
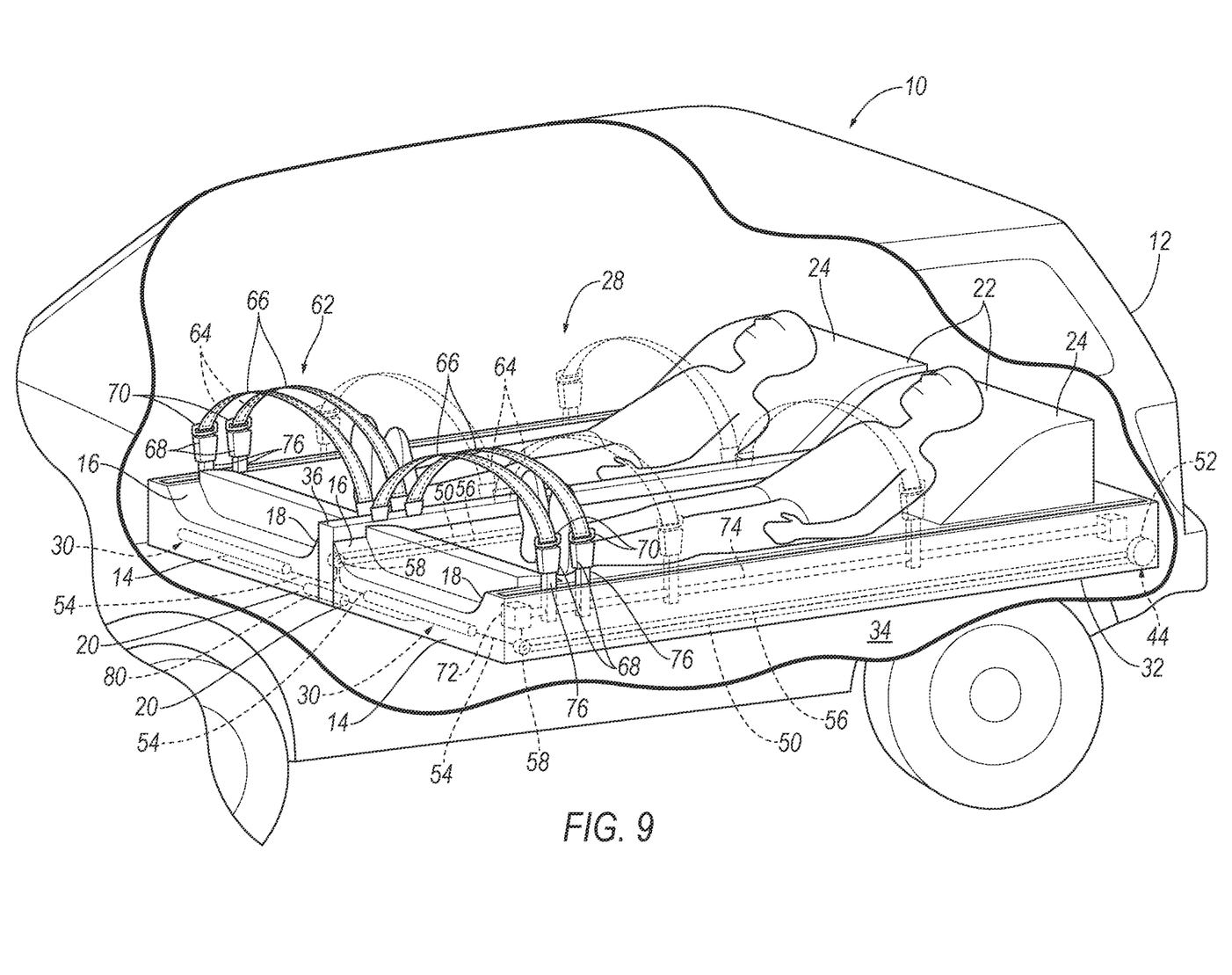
FIG. 9 is a perspective view of the vehicle with the belt restraint assembly in a deployed position in broken lines.

The bed assembly 28 includes at least one belt restraint assembly 62. In the example shown in the figures, the belt restraint assembly 62 includes two belt restraints 66 on the first bed 14 and two belt restraints 66 on the second bed 14. The belt restraint assembly 62 includes webbing 64 that is moveable along the axis A of the bed 14, i.e., along the occupant support surface 24. For example, the bed 14 may include tracks 50 that slideably receive the webbing 64 and the webbing 64 may be moveable relative to the bed 14 in the tracks 50. Specifically, the webbing 64 may move from a stowed position, as shown in FIG. 8 to a deployed position, as shown in broken lines in FIG. 9. This allows for ingress and egress in the stowed position. The webbing 64 may be moveable manually by the occupant of the bed 14. As another example, the webbing 64 may be moveable automatically, as shown in the figures and described further below.

The belt restraint 66 may be extendable from the first side 16 of the bed 14 to the second side 18 of the bed 14. Specifically, the belt restraint 66 may be between the occupant support surface 24 and the airbag 26 when the airbag 26 is in the inflated position. In one example the belt restraint 66 biases the airbag 26 away from the occupant support surface 24 when the airbag 26 is in the inflated position.

Figure 1:
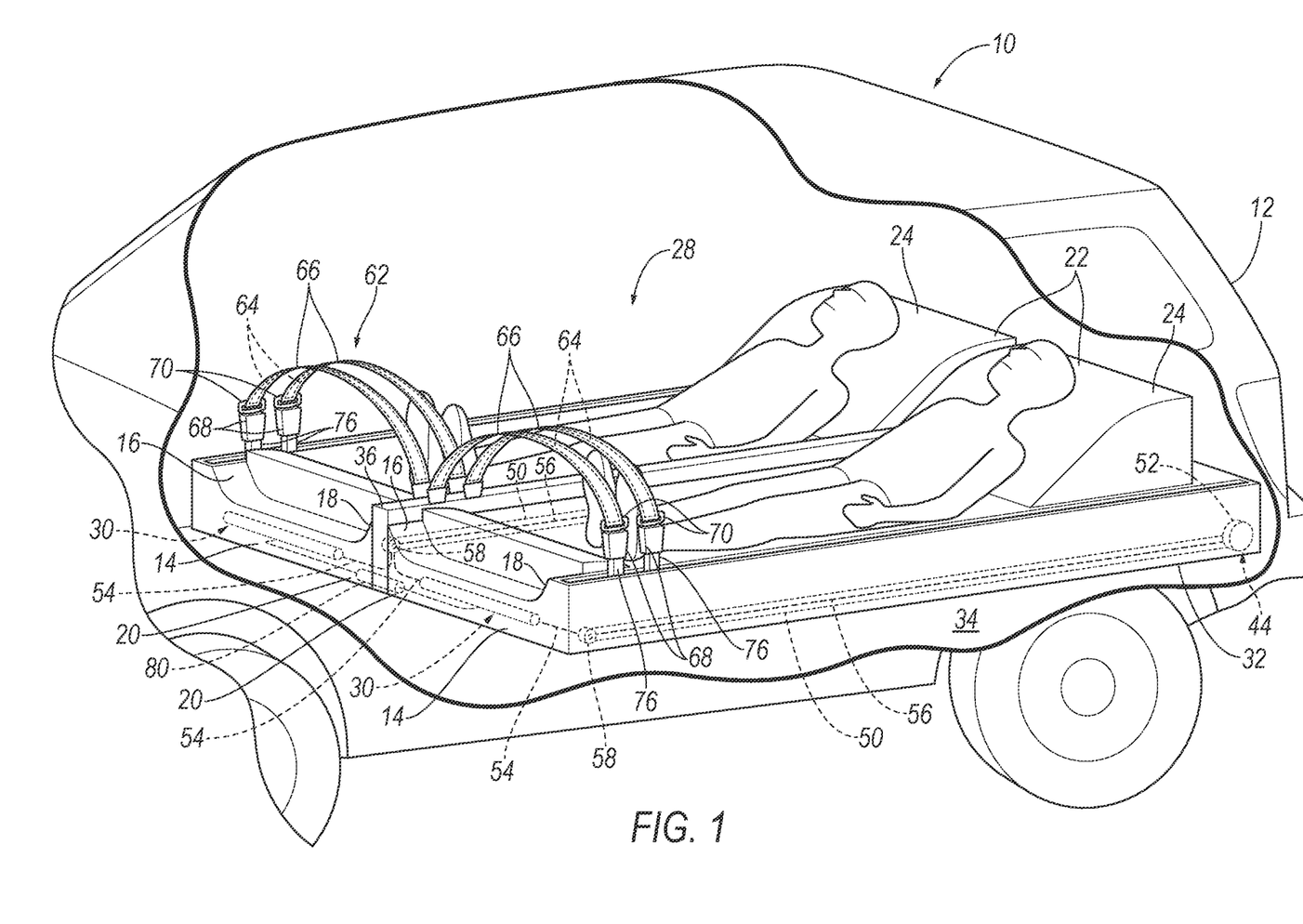

The webbing 64 is inflatable from an uninflated position, as shown in FIGS. 1, 6, and 7, to an inflated position, as shown in FIGS. 2-9. In the inflated position, the webbing 64 is inflated with inflation medium, and the size of the webbing 64 is increased relative to the uninflated position. Specifically, the webbing 64 includes the inflation chamber that is inflated by inflation medium. The webbing 64 may be in fluid communication with the inflator(s) 80 that inflates the airbags 26, or the belt restraint assembly 62 may include a separate inflator 80 (not shown) that inflates the webbing 64. The webbing 64 may be in fluid communication with the respective inflator 80 with, for example, fill tubes that move with the webbing 64 as the webbing 64 moves relative to the bed 14.

Whether the webbing 64 is manually moveable relative to the bed 14 or automatically moveable relative to the bed 14, the belt restraint assembly 62 may include a buckle 68 mounted to the bed 14 and a clip 70 on the webbing 64 that is releasably engageable with the buckle 68. Specifically, the buckle 68 is slideably engaged with the bed 14 to move relative to the bed 14 along the axis A. In the examples shown in the figures, the belt restraint assembly 62 includes clips 70 on the webbing 64 and the clips 70 are engaged with the buckles 68. In such examples, the belt restraint assembly 62 includes an anchor (not identified) on the other side of the webbing 64 and slideably engaged with the bed 14. In the example shown in the figures, merely by way of example, the anchors are slideably engaged with the divider 36 and the buckles 68 are slideably engaged with outboard sides 16, 18 of the beds 14 namely, the first side 16 of the first bed 14 and the second side 18 of the second bed 14. The components of the buckle 68 and the clips 70 that releasably engage each other may be of the type known in the art, e.g., as used in seatbelts.

The bed assembly 28 may include a drive mechanism 72 that automatically moves the webbing 64 relative to the bed 14. In the example shown in the figures, the bed assembly 28 includes two drive mechanisms 72. Specifically, as an example, one drive mechanism 72 is on the first side 16 of the first bed 14 and one drive mechanism 72 is on the second side 18 of the second bed 14. In such an example, the other side of the webbing 64 may be passively slideably engaged with the bed 14 and may be pulled by the drive mechanism 72, e.g., the webbing 64 may be passively slideably engaged with the divider 36 between the beds 14 and the webbing 64 may be positioned along the bed 14 with the drive mechanism 72 at the first side 16 of the first bed 14 or second side 18 of the second bed 14. As another example, the bed assembly 28 may include one or more drive mechanisms 72 at the divider 36 and/or the webbing 64 may be passively slideably engaged with the first side 16 of the first bed 14 or the second side 18 of the second bed 14.

As shown in the example in the figures, the drive mechanism 72 may include a lead screw 74 and a carriage 76 that rides on the lead screw 74 and is fixed to the webbing 64, e.g., through the buckle 68 and clip 70 in the example shown in the figures. Specifically, the carriage 76 is threadedly engaged with the lead screw 74 and moves linearly relative to the bed 14 as the lead screw 74 rotates. The drive mechanism 72 may include an electric motor engaged with the lead screw 74. The electric motor rotates the lead screw 74 to move the carriage 76 relative to the bed 14. The drive mechanism 72 may be in communication with an occupancy sensor identifying occupancy of the bed 14. Specifically, a computer 60 of the vehicle 12, e.g., a restraints control module, may control the motor based on the occupancy sensor. In examples that include more than one belt restraint 66 on one drive mechanism 72, one or more of the carriages 76 may include a clutch 78 that releases from the lead screw 74 when the carriage 76 is in the deployed position. The clutch 78 allows the carriages 76 to move to different positions along the axis A.

The belt restraint assembly 62 is designed to be moveable along the axis A of the bed 14 without interference from appendages of the occupant. In the example shown in the figures, the carriage 76 may be extended upwardly from the lead screw 74 to position the webbing 64 above the occupant support surface 24. In addition or in the alternative, the webbing 64 may have a shape memory, e.g., with a shape memory material embed 14ded in the webbing 64, that arcs the webbing 64 over appendages of the occupant.

In operation, the belt restraint 66 assemblies are in the stowed position when the bed 14 is unoccupied. When an occupant lies down on the bed 14, the webbing 64 is moved to the deployed position, e.g., manually or automatically, as described above. In the absence of a vehicle impact, the occupant may move the webbing 64 to the stowed position, e.g., based on input from operation of the vehicle 12 and/or from the occupant, so that the occupant may leave the bed 14. While the occupant is on the bed 14, both the airbag 26 and the webbing 64 inflate in response to a detected vehicle impact. When inflated, the airbag 26 surrounds the occupant support surface 24 to control the kinematics of the occupant. The webbing 64, when inflated, also controls the kinematics of the occupant.

Figure 10:
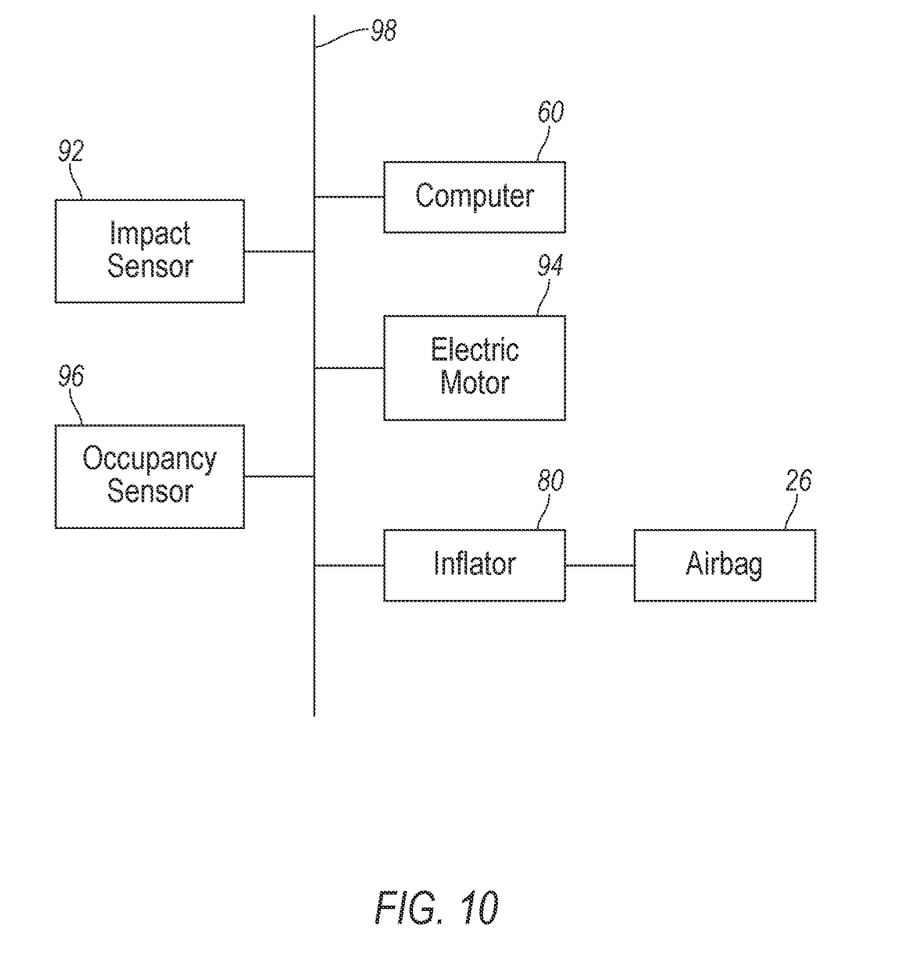
FIG. 10 is a block diagram of a system of the vehicle.

The computer 60, e.g., the restraints control module, includes a processor and a memory. The memory includes one or more forms of computer 60 readable media, and stores instructions executable by the processor for performing various operations, including as disclosed herein. For example, the computer 60 can be a generic computer 60 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 60 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 60. The memory can be of any type, e.g., hard disk drives, solid state drives, servers, or any volatile or non-volatile media. The memory can store the collected data sent from the sensors. The memory can be a separate device from the computer 60, and the computer 60 can retrieve information stored by the memory via a network in the vehicle 12, e.g., over a CAN bus, a wireless network, etc. Alternatively or additionally, the memory can be part of the computer 60, e.g., as a memory of the computer 60. The computer 60 may include programming to operate one or more of vehicle 12 brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 60, as opposed to a human operator, is to control such operations. Additionally, the computer 60 may be programmed to determine whether and when a human operator is to control such operations. The computer 60 may include or be communicatively coupled to, e.g., via a vehicle 12 network such as a communications bus as described further below, more than one processor, e.g., included in components such as sensors, electronic control units (ECUs) or the like included in the vehicle 12 for monitoring and/or controlling various vehicle 12 components, e.g., a powertrain controller, a brake controller, a steering controller, etc. As shown in FIG. 10, the computer 60 is generally arranged for communications on a vehicle 12 communication network that can include a bus in the vehicle 12 such as a controller area network CAN or the like, and/or other wired and/or wireless mechanisms. Alternatively or additionally, in cases where the computer 60 actually comprises a plurality of devices, the vehicle 12 communication network may be used for communications between devices represented as the computer 60 in this disclosure. Further, as mentioned below, various controllers and/or sensors may provide data to the computer 60 via the vehicle 12 communication network.

The vehicle 12 may include at least one impact sensor for sensing impact of the vehicle 12, and the computer 60 in communication with the impact sensor. Alternatively or additionally to sensing impact, the impact sensor may be configured to sense impact prior to impact, i.e., pre impact sensing. The impact sensor is configured to detect an impact to the vehicle 12. The impact sensor may be of any suitable type, for example, post contact sensors such as accelerometers, pressure sensors, and contact switches; and pre impact sensors such as radar, LIDAR, and vision sensing systems. The vision sensing systems may include one or more cameras, CCD image sensors, CMOS image sensors, etc. The impact sensor may be located at numerous points in or on the vehicle 12.

The numerical adjectives, e.g., "first," "second," "third," and "fourth," are used herein merely as identifiers and do not signify order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a vehicle bed having a reclined position in which the vehicle bed is elongated along an axis, the vehicle bed including a first side and a second side with the axis between the first side and the second side;
   the vehicle bed in the reclined position having a first end and a second end spaced from each other along the axis, the vehicle bed having an occupant support surface between the first end and second end; and
   an airbag that is inflatable from an uninflated position to an inflated position, the airbag being housed in the first end in the uninflated position;
   the airbag in the inflated position having an arch shape between the first side of the vehicle bed and the second side of the vehicle bed, the arch shape being elongated along the axis from the first end toward the second end above the occupant support surface; and
   the airbag including an inflation chamber that is arch shaped from the first end of the bed to the second end of the bed.

2. The assembly of claim 1, further comprising a pyrotechnic device operatively coupled to the airbag to pull the airbag from the first end toward the second end.

3. The assembly as set forth in claim 2, wherein the pyrotechnic device is connected to the bed.

4. The assembly as set forth in claim 2, further comprising a tether between the pyrotechnic device and the airbag.

5. The assembly of claim 1, further comprising a pyrotechnic device connected to the bed and a tether connected to the pyrotechnic device and the airbag.

6. The assembly of claim 5, wherein the pyrotechnic device is connected to the second end of the bed.

7. The assembly of claim 1, further comprising a track elongated along the axis, a tether connected to the airbag and being slideably engaged with the track, and a pyrotechnic device connected to the tether.

8. The assembly of claim 7, further comprising a cable connecting the pyrotechnic device to the tether.

9. The assembly of claim 1, further comprising at least one belt restraint extendable from the first side of the bed to the second side of the bed, the belt restraint being between the occupant support surface and the airbag in the inflated position.

10. The assembly of claim 9, wherein the belt restraint biases the airbag away from the occupant support surface in the inflated position.

11. The assembly of claim 1, wherein the arch shape of the airbag extends from the first end to the second end in the inflated position.

12. The assembly of claim 1, wherein the airbag has an arched tubular segment extending from the first side of the bed to the second side of the bed in the arch shape at the first end of the bed.

13. The assembly of claim 1, wherein the airbag includes a plurality of linear tubular segments each elongated along the axis, the linear tubular segments being positioned in the arch shape.

14. The assembly of claim 13, wherein the airbag includes a plurality of uninflatable panels, the uninflatable panels and linear tubular segments being in an alternating arrangement in the arch shape.

15. The assembly of claim 13, further comprising an uninflatable panel connecting at least two of the linear tubular segments.

16. The assembly of claim 13, wherein the airbag has an arched tubular segment supporting the linear tubular segments, the arched tubular segment extending from the first side of the bed to the second side of the bed in the arch shape.

17. The assembly of claim 16, wherein the airbag has a second arched tubular segment supported by the linear tubular segments, the second arched tubular segment extending from the first side of the bed to the second side of the bed in the arch shape, the arched tubular segment being at the first end of the bed and the second arched tubular segment being at the second end of the bed.

18. The assembly of claim 1, wherein the airbag includes a panel at the first end of the bed in a plane transverse to the axis of the bed.

19. An assembly comprising:
   a vehicle bed having a reclined position in which the vehicle bed is elongated along an axis, the vehicle bed including a first side and a second side with the axis between the first side and the second side;
   the vehicle bed in the reclined position having a first end and a second end spaced from each other along the axis, the vehicle bed having an occupant support surface between the first end and second end;
   an airbag that is inflatable from an uninflated position to an inflated position, the airbag being housed in the first end in the uninflated position;
   the airbag in the inflated position having an arch shape between the first side of the vehicle bed and the second side of the vehicle bed, the arch shape being elongated along the axis from the first end toward the second end above the occupant support surface;
   a track elongated along the axis;

a tether connected to the airbag and being slideably engaged with the track; and a pyrotechnic device connected to the tether.

20. An assembly comprising:

a vehicle bed having a reclined position in which the vehicle bed is elongated along an axis, the vehicle bed including a first side and a second side with the axis between the first side and the second side;

the vehicle bed in the reclined position having a first end and a second end spaced from each other along the axis, the vehicle bed having an occupant support surface between the first end and second end; and an airbag that is inflatable from an uninflated position to an inflated position, the airbag being housed in the first end in the uninflated position;

the airbag in the inflated position having an arch shape between the first side of the vehicle bed and the second side of the vehicle bed, the arch shape being elongated along the axis from the first end toward the second end above the occupant support surface; and the airbag has an arched tubular segment extending from the first side of the bed to the second side of the bed in the arch shape at the first end of the bed.

* * * * *